FIG. I

United States Patent Office 3,389,612
Patented June 25, 1968

3,389,612
DEVICE FOR EFFECTING THE ACCURATE POSITIONAL ADJUSTMENT OF A COMPONENT
Rémy Thireau, Garches, France, assignor to Commissariat à l'Energie Atomique, Paris, France
Filed Nov. 22, 1966, Ser. No. 596,200
Claims priority, application France, Dec. 3, 1965, 40,925
5 Claims. (Cl. 74—89.15)

The present invention is concerned with an adjustment device of very small size which serves to displace over a short distance a component which has a relatively high inertia and the position of which must nevertheless be determined with strict precision.

The device under consideration is of the type comprising a movable control rod provided with two screw-threads of different pitch, one screw-thread being engaged with a first nut which is secured against both rotational motion and translational motion whilst the other screw-thread is engaged with a second nut which is secured against rotational motion alone and which serves to displace said component over a distance corresponding to the geometrical sum of the translational displacement of the rod and of the translational displacement of said second nut along said rod, said device being characterized in that it comprises a stationary bracket for supporting the first nut, a motor which controls the displacement of the rod and the rotating shaft of which is fixed to said rod and a guide means which is fixed on said motor and adapted to slide over the first nut at the time of translational motion of said rod which causes the translational motion of said motor.

In accordance with another feature of this invention, the device comprises a pin for the pivotal motion of the first nut which supports the guide means and the motor, the said pivot-pin being adapted to pass through the stationary bracket at right angles to the threaded rod.

The position of the component can thus be by means of a translational displacement either adjusted alone or in conjunction with a pivotal movement, the amplitude of which is determined with precision by the difference in the displacements of the rod and of the movable nut. By choosing sufficiently different pitches for the screw-threads of the rod, it is possible to obtain displacements which are as small as may be desired and known in advance with a high degree of accuracy.

Moreover, any movement of rotation of the motor unit about its axis is prevented by the presence of the guide which is sliding on the first nut whilst said motor carries out a movement of translation with the rod. The driving torque is therefore absorbed by said guide and the first nut which also absorbs axial reactions. Provision can accordingly be made for a motor having extremely small dimensions even for the purpose of displacing a component which has high inertia.

A number of other properties and advantages of the invention will in any case become apparent from the following detailed description of one example of execution which is given without implied limitation, reference being made to the accompanying drawings, in which.

Figure 1:
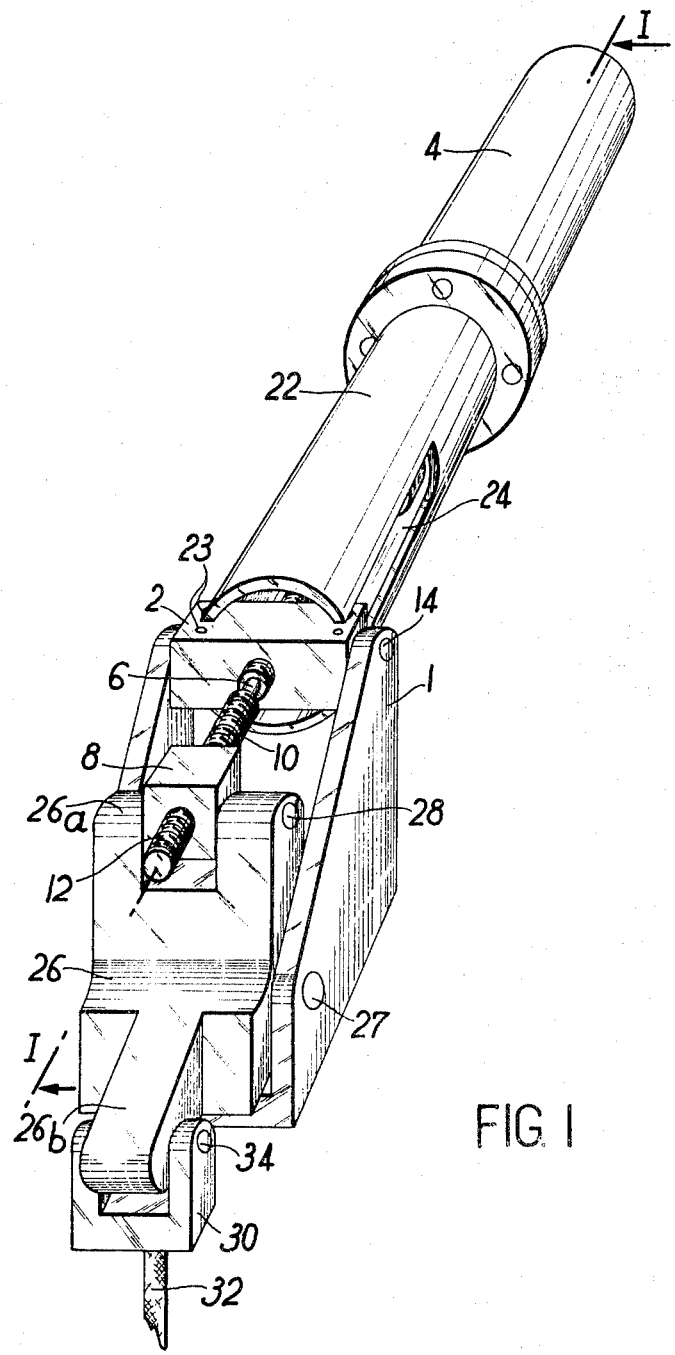
FIG. 1 is a view in perspective of the adjusting device.

The adjusting device comprises (as shown in FIG. 1) a support constituted by a stationary bracket or yoke 1 in which is pivotally mounted a nut 2 traversed by a control rod 6 which is coupled on each side of said nut to a motor 4 and to a second nut 8 which is designed to impart motion to the component 5 to be displaced (as shown diagrammatically).

The rod 6 is provided with two screw-threads 10, 12 of different pitch; one screw-thread 10 corresponds to the internal thread of the support nut 2 whilst the other thread 12 has the same pitch as the internal thread of the nut 8 to be displaced. The nut 2 is pivoted about pins 14 which are fixed in the bracket 1 and which prevent any rotational or translational motion of the nut with respect to the rod. On the other hand, the nut 8 is secured only against rotation by the component to be displaced and is movable in translation along the rod 6 or more exactly along the screw-thread 12 of said rod.

Any displacement of the rod 6 within the nut 2 produces a translational displacement of the screw-thread 12 and a corresponding displacement of the nut 8 but also a movement of rotation of the same screw-thread 12 within said nut 8 which is locked rotationally, with the result that said nut moves along the rod 6 over a distance which depends on the difference between the pitches of the threads 10 and 12 and on the respective directions of these latter.

The component to be displaced which is coupled to the nut 8 and driven by this latter is subjected to a movement which is the resultant of the translational movements of the rod of the nut with respect to said rod 6.

When these screw-threads have the same direction, the displacements of the nut 8 and of the rod 6 take place in opposite directions and the resultant travel of the component is the difference between two displacements in opposite directions or the geometrical sum of the two translational movements along a same axis. Similarly, when the screw-threads are of opposite pitch, the two displacements take place in the same direction and are added to give a resultant movement which is the sum of said displacements.

The shaft 16 of the motor serves to drive the rod 6 and which is preferably an electric motor is rigidly coupled to said rod 6. Said shaft can be formed in one piece with said rod or else it can be coupled thereto in the manner which is shown by way of example in FIG. 2 by means of a locking-pin 18 within a hollow cylinder or within a yoke 20 which is rigidly fixed to the end of said rod 6.

The motor 4 is also secured to a guide-tube 22 which surrounds the hollow cylinder or the yoke 20 as well as the screw-thread 10 over practically the full length of this latter. Said guide-tube is provided with two longitudinal slots 24 located diametrically opposite to each other and forming guides so as to permit the sliding motion of said guide-tube 22 over the nut 2 in dependence on the displacement of the rod 6 which drives the motor 4. The sliding motion of the guide-tube is carried out with slight friction; and provision can even be made for ball bearings 23 which are mounted between said guide-tube and said nut.

Figure 2:
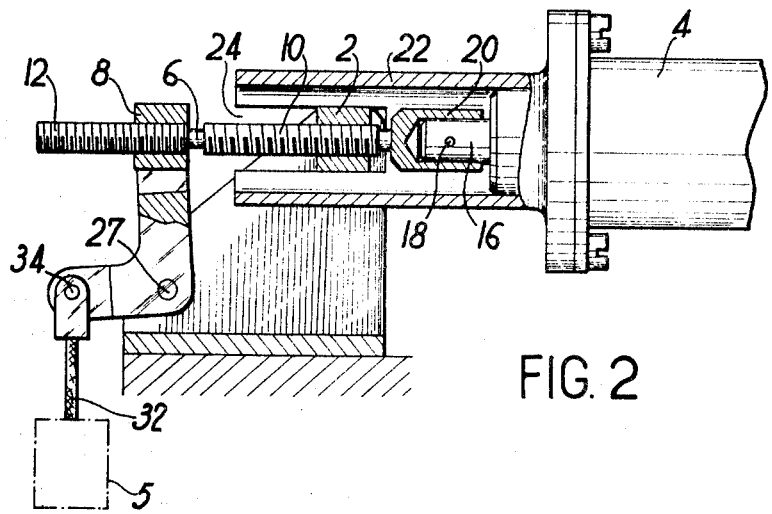
FIG. 2 is a sectional view along line I—I of FIG. 1.
Figure 3:
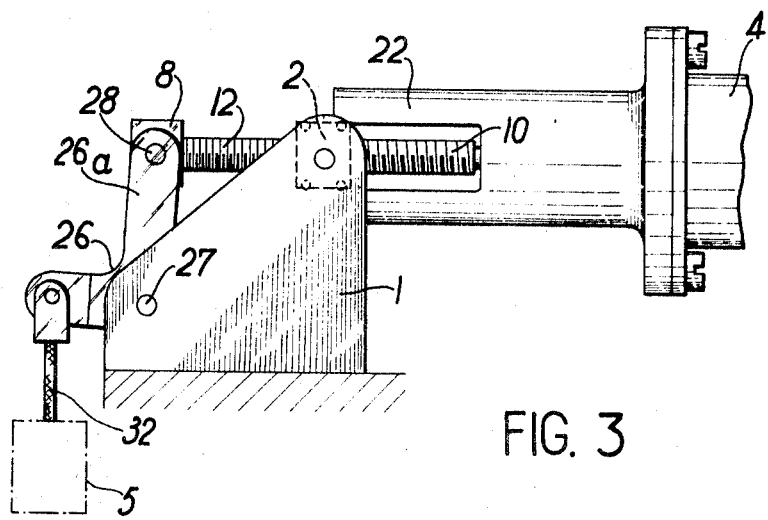
FIG. 3 is a side view of the same device in the rear position of the control rod.

FIGS. 2 and 3 show the two end positions of the device. In FIG. 2, the nut 2 is located nearly at the ends of the slots 24 and the guide-tube 22 has engaged between the arms of the support bracket 1. In the case of right-hand threads as shown in the figure, it can be visualized that, when the motor 4 causes the rod 6 to rotate clockwise (looking on the free end of the rod), the threaded portion 10 is screwed into the nut 2 and the rod 6 moves the guide-tube 22 outwards from the bracket 1, that is to say towards the position shown in FIG. 3. The screw-thread 12 which, in the case of the figure, has a smaller pitch than that of the screw-thread 10 but has the same direction, rotates in the nut 8 and moves this latter in the direction opposite to that of the rod 6 and at a distinctly lower speed. The component to be positionally adjusted is displaced at the same speed as the nut 8 over a distance which is strictly determined by the choice of the pitches of the screw-threads 10 and 12.

In the example of execution which is shown in the drawings, the said component to be positionally adjusted is coupled to the nut 8 by means of an elbowed lever 26, one of the arms of which forms a yoke 26a traversed by pivot-pins 28 for the articulation of the nut 8 whilst the other arm 26b (as shown in FIG. 1) carries a yoke 30. Said yoke 30 is secured at the end of a control cable 32 and is pivotally mounted at 34 on the arm 26b of the lever 26 which is pivotally mounted at 27 on the bracket 1. As and when the movements of the rod 6 take place, the displacement of the nut 8 is progressively accompanied by the pivotal motion of the lever 26 about the pin 27 either in one direction or in the other. Said nut 8 is capable of pivoting about the pin 28 but remains in alignment with the rod 6 and the motor 4 which perform a pivotal motion with the nut 2 about the pins 14 whilst the pin 28 which is moved by the arm 26a performs a pivotal movement about the pin 27. The cable 32 is then either raised or lowered but always maintained substantially parallel to itself by virtue of the articulation 34.

In another form of execution which is not shown in the drawings, the component to be displaced is coupled directly to the nut 8 and is displaced in a direction parallel to the rod 6. Said component can also be caused to follow a curved path by virtue of the combination of the pivotal motion of the rod 6, motor 4 and nut 2 about the pin 14 with the translational motion of the nut 8. Guiding means which permit of this displacement are accordingly associated with the nut 8 or with the component itself.

Irrespective of the curvature of the path referred to and the mode of coupling with the nut 8, the position of the component can be adjusted with a high degree of precision simply by controlling the time of operation of the motor 4 inasmuch as the distance over which the nut 8 travels as a function of the number of revolutions of the shaft 16 can readily be determined.

The complete device is essentially supported by the nut 2. In fact, as the guide-tube 22 slides over said nut, it prevents any rotation of the motor 4 and absorbs the driving torque whilst the said nut 2 takes up axial reactions. Any need of a special support for the motor 4 is thus dispensed with.

The motor can be of very small size even when the component to be positionally adjusted has a relatively high inertia. It is thus possible, for example, to displace a load of 300 kilograms by means of a micro motor, the rotating shaft of which was fixed to a threaded rod 4 millimeters in diameter.

The difference between the screw-threads makes it possible in addition to increase the power supplied by said motor along the axis thereof in a proportion which is determined by the choice of their respective pitches.

As will be readily understood, a number of different modifications could be made in the form of construction which has just been described by way of example, without thereby departing either from the scope or the spirit of the invention.

What is claimed is:

1. A device for the accurate positional adjustment of a component, said device comprising a movable rod provided with two threaded portions of different pitch, a first nut secured against both translational motion and rotational motion and engaged with the first threaded portion of said rod, a second nut for imparting motion to the component to be displaced, said second nut being secured against rotational motion alone and engaged with the second threaded portion of said rod, a stationary bracket for supporting said first nut, a motor which controls the displacement of the rod and the rotating shaft of which is fixed to said rod and a guide means which is fixed on said motor and adapted to slide over said first nut at the time of translational motion of said rod which causes the translational motion of said motor.

2. A device as defined in claim 1, wherein said device comprises a pin for the pivotal motion of the first nut which supports the guide means and the motor, said pivot-pin being adapted to pass through the stationary bracket at right angles to the threaded rod.

3. A device as defined in claim 1, wherein the guide means consists of two longitudinal slots in diametrically opposite relation and formed in a guide-tube which is rigidly fixed to the motor.

4. A device as defined in claim 1, wherein said device comprises an elbowed lever which provides a coupling between the second nut and the component to be displaced and which is pivotally mounted in the support bracket.

5. A device as defined in claim 4, wherein the lever comprises a yoke and a transversal pin in this yoke for pivoting of the second nut and for locking said second nut against rotational motion.

References Cited

UNITED STATES PATENTS

| 2,247,562 | 7/1941 | Santen | 74—59 |
| 2,261,450 | 11/1941 | Pritchett | 81—106 |

FRED C. MATTERN, JR., *Primary Examiner.*

F. D. SHOEMAKER, *Assistant Examiner.*